United States Patent
Stanek et al.

(10) Patent No.: US 7,810,127 B2
(45) Date of Patent: *Oct. 5, 2010

(54) SYSTEM AND METHOD FOR EVALUATING THE OPERATIONAL STATUS OF A STB IN A CABLE NETWORK

(75) Inventors: Matthew P. Stanek, Leander, TX (US); William H. Berger, Austin, TX (US); Todd P. Bowen, Austin, TX (US)

(73) Assignee: Time Warner Cable, Inc., New York, NY (US)

( * ) Notice: Subject to any disclaimer, the term of this patent is extended or adjusted under 35 U.S.C. 154(b) by 929 days.

This patent is subject to a terminal disclaimer.

(21) Appl. No.: 11/215,943

(22) Filed: Aug. 31, 2005

(65) Prior Publication Data
US 2007/0050836 A1 Mar. 1, 2007

(51) Int. Cl.
- H04N 7/14 (2006.01)
- H04N 7/16 (2006.01)
- G06F 15/04 (2006.01)
- H04L 12/24 (2006.01)

(52) U.S. Cl. ............... 725/129; 725/107; 709/217; 370/241

(58) Field of Classification Search ............ 725/107, 725/111, 129, 151, 105, 114–117, 131, 132, 725/138–140, 152; 709/217–224; 370/241–244, 370/250; 379/1.01–1.04
See application file for complete search history.

(56) References Cited

U.S. PATENT DOCUMENTS

| | | | |
|---|---|---|---|
| 5,432,542 A * | 7/1995 | Thibadeau et al. ............ 725/35 |
| 5,666,481 A | 9/1997 | Lewis | |
| 5,884,284 A | 3/1999 | Peters et al. | |
| 5,987,135 A * | 11/1999 | Johnson et al. ............ 709/224 |
| 6,000,045 A | 12/1999 | Lewis | |
| 6,272,150 B1 | 8/2001 | Hrastar et al. | |
| 6,393,478 B1 | 5/2002 | Bahlmann | |
| 6,481,011 B1 * | 11/2002 | Lemmons ................ 725/47 |
| 6,526,582 B1 | 2/2003 | Brodigan et al. | |
| 6,598,057 B1 | 7/2003 | Synnestvedt et al. | |
| 6,704,288 B1 | 3/2004 | Dziekan et al. | |
| 6,769,127 B1 * | 7/2004 | Bonomi et al. ............ 725/39 |
| 6,898,800 B2 | 5/2005 | Son et al. | |
| 6,947,980 B1 | 9/2005 | Knudsen et al. | |
| 7,111,318 B2 | 9/2006 | Vitale et al. | |
| 7,137,043 B1 * | 11/2006 | Kane et al. ................ 714/57 |

(Continued)

*Primary Examiner*—Andrew Y Koenig
*Assistant Examiner*—Jason Thomas
(74) *Attorney, Agent, or Firm*—The Marbury Law Group, PLLC (57) ABSTRACT

An STB analysis system comprises an STB checker client and an STB analysis server. The STB checker client comprises an STB query interface to communicate with the STB analysis server to acquire information indicative of the operational status of an STB and to display the information graphically. A user requests data relating to a particular STB by entering the MAC address of an STB into a query field. The STB checker client interacts with an STB analysis server to acquire information relating to the subscriber associated with the STB MAC address, the services authorized for the STB, and data indicative of the status and performance of the STB. In addition, the STB analysis server interacts with the STB operating system to retrieve diagnostic data from the STB logs. The STB checker client further is adapted to permit remotely resetting the STB regardless of its current status.

32 Claims, 4 Drawing Sheets

U.S. PATENT DOCUMENTS

| | | | |
|---|---|---|---|
| 7,188,116 B2 * | 3/2007 | Cheng | 707/101 |
| 7,227,889 B1 | 6/2007 | Roeck, et al. | |
| 7,251,820 B1 | 7/2007 | Jost et al. | |
| 7,290,046 B1 * | 10/2007 | Kumar | 709/223 |
| 7,313,749 B2 * | 12/2007 | Nerl et al. | 714/764 |
| 7,343,614 B1 * | 3/2008 | Hendricks et al. | 725/8 |
| 2001/0034852 A1 | 10/2001 | Kawashima | |
| 2002/0019983 A1 | 2/2002 | Emsley et al. | |
| 2002/0061012 A1 | 5/2002 | Thi et al. | |
| 2002/0109879 A1 | 8/2002 | Wing So | |
| 2002/0136165 A1 | 9/2002 | Ady et al. | |
| 2002/0138848 A1 * | 9/2002 | Alao et al. | 725/109 |
| 2002/0143775 A1 | 10/2002 | Wilkinson et al. | |
| 2003/0020765 A1 | 1/2003 | Kussmaul et al. | |
| 2003/0028624 A1 * | 2/2003 | Hasan et al. | 709/220 |
| 2003/0028891 A1 * | 2/2003 | Hardt et al. | 725/107 |
| 2003/0036848 A1 | 2/2003 | Sheha et al. | |
| 2003/0040936 A1 | 2/2003 | Nader et al. | |
| 2003/0145075 A1 | 7/2003 | Weaver et al. | |
| 2003/0163831 A1 * | 8/2003 | Gall et al. | 725/127 |
| 2003/0167319 A1 | 9/2003 | Venkatesulu et al. | |
| 2003/0206719 A1 * | 11/2003 | Bumgardner et al. | 386/83 |
| 2004/0008761 A1 | 1/2004 | Kelliher et al. | |
| 2004/0044554 A1 | 3/2004 | Bull et al. | |
| 2004/0054771 A1 | 3/2004 | Roe et al. | |
| 2004/0111311 A1 | 6/2004 | Ingman et al. | |
| 2004/0120250 A1 | 6/2004 | Langevin et al. | |
| 2005/0039213 A1 * | 2/2005 | Matarese et al. | 725/95 |
| 2005/0111063 A1 | 5/2005 | Shar et al. | |
| 2005/0144641 A1 * | 6/2005 | Lewis | 725/60 |
| 2005/0183130 A1 * | 8/2005 | Sadja et al. | 725/107 |
| 2005/0204290 A1 | 9/2005 | Eddy et al. | |
| 2005/0286466 A1 | 12/2005 | Tagg et al. | |
| 2006/0031436 A1 * | 2/2006 | Sakata et al. | 709/221 |

* cited by examiner

| 300 DVR INFORMATION | |
|---|---|
| NUMBER OF RECORDINGS | [VALUE] |
| NUMBER OF SCHEDULED RECORDINGS | [VALUE] |
| FREE DISK SPACE | [VALUE] |

FIGURE 4

SYSTEM AND METHOD FOR EVALUATING THE OPERATIONAL STATUS OF A STB IN A CABLE NETWORK

BACKGROUND

Embodiments of this invention are generally related to interactive cable television services and more particularly related to enabling a cable television service provider to remotely ascertain the status of a set top box (STB) over a network.

Cable television service began as a means for transporting broadcast signals to viewers who needed or desired better signal quality. Initially, the transported signals were mapped to the broadcast channels. As more channels were added, the over-the-air signals were mapped to channels within the cable selected by the service provider. At least in part, this mapping relieved interference problems from local broadcast signals. A typical analog cable system provided 110 6-MHz channels. In order to receive these channels, a subscriber required either a cable-ready television or an STB. The STB evolved to provide additional features. For example, premium channels were scrambled so that only those subscribers with an STB and an appropriate code could view the program.

With the advent of digital transmission, the role of the STB has changed dramatically. Not only is digital signal transmission significantly more bandwidth efficient than analog (e.g., 10 digital channels may be carried in one 6 MHz analog channel), but the digital signal can be manipulated to include more and varied content. The STB, as a digital device, is also capable of two-way (upstream as well as downstream) communication. With respect to video services, modern set top boxes send upstream signals to the headend to request video on demand (VOD) services, pay per view (PPV) services, and switched video broadcast (SVB) services and to issue control commands (play, stop, fast forward, rewind, and pause) that affect the video stream. Two-way STBs are addressable, can be associated with a subscriber, and can be associated with a physical location within an HFC cable network. STBs integrated with, or connected to, DVRs allow subscribers to determine what to watch and when.

The ability of the STB to interact with the digital signal, the subscriber, and the cable system operator is determined by the applications that operate on the STB platform. PowerTV, Windows CE, OS-9, JavaOS for Consumers, and Sony Corp.'s Aperios are examples of operating systems designed for STBs. Because of the diversity of STB OSs, a standard "middleware" application interface (referred to as the OCAP Project) is being developed by Cable Television Laboratories, Inc. OCAP specifies a standard set of application programming interfaces (APIs) for "host devices" so that those devices can receive the advanced two-way interactive services and applications being provided by the cable operator. Cable subscribers with OCAP-enabled digital televisions, retail set-top boxes, and other interactive digital cable products will be able to receive all of the cable operator's services just as if the subscriber were leasing a comparable set-top box from the operator. These advanced services and applications may include:

Electronic program guides (EPGs);
Video-on-demand (VOD);
Interactive personal video recorders;
Interactive sports and game shows;
Impulse pay-per-view (IPPV);
Web access, and features such as e-mail, chat, and instant messaging;
Interactive games; and
Services such as shopping (television commerce, or "T-Commerce"), and home banking.

The hardware specifications of OCAP include the Host Core Functional Requirements, a copy protection system including security and user authentication, and the Cable-CARD™ module/host interface. These hardware specifications define a removable security module that separates the cable operator's proprietary conditional access system from the retail digital cable device, thereby enabling portability of the host to other cable networks. This means that if a consumer purchases a set-top box or an integrated DTV in New York and then relocates to Los Angeles, that set-top box or integrated DTV will be operable with the new regional cable provider's equipment.

As STBs become more feature rich, the task of supporting the STBs in a cable system environment requires sophisticated analytical tools to determine whether subscriber service issues are related to the STB or to other components of the cable network. STB performance tools currently require cable service technicians (CSTs) to walk subscribers through a complex series of diagnostic routines on the cable box in order to retrieve data for troubleshooting. These data are presented on multiple pages making navigation by subscribers confusing and time consuming.

Troubleshooting an STB may also require data indicative of the operational status of various components and systems of the cable network. Such data are useful in eliminating sources of problems with STB performance. Typical STB troubleshooting tools do not utilize these data.

What is needed is a system and method that provides a comprehensive view of an STB's performance without depending on subscriber interaction with the STB to produce troubleshooting data.

SUMMARY

In an embodiment of the present invention, an STB analysis system comprises an STB checker client and an STB analysis server. The STB checker client comprises an STB query interface (herein, "SQI") to communicate with the STB analysis server to acquire information indicative of the operational status of an STB and to display the information graphically. In this embodiment, the STB checker client comprises the SQI, a processor, a display, a user input, and a LAN interface. In another embodiment of the present invention, the processor, display, user input, and LAN interface functions are provided by a general purpose computing device and the SQI functionality is provided by a Web browser.

A user, typically but without limitation, a customer service technician, requests data relating to a particular STB by entering the MAC address of an STB into a query field. The STB checker client interacts with an STB analysis server to acquire information relating to the subscriber associated with the STB MAC address, the services authorized for the STB, and data indicative of the status and performance of the STB. By way of illustration and not as a limitation, the STB checker client displays administrative information comprising subscriber identifying information and account information. In addition, the STB analysis server interacts with the STB operating system to retrieve diagnostic data from the STB logs. The STB checker client is further adapted to permit remotely resetting the STB regardless of its current status.

It is therefore an aspect of the present invention to query diverse sources for data relating to an STB.

It is another aspect of the present invention to allow a user of the STB checker client to customize the STB checker client by selecting the STB data to be queried and displayed.

It is still another aspect of the present invention to permit the STB checker client to be operated on portable computing devices.

It is yet another aspect of the present invention to evaluate data relating to a failed STB, to provide a diagnosis of the possible causes for the failure, and to suggest steps to remedy the failure.

It is another aspect of the present invention to evaluate data relating to failed STBs to determine whether the data reflect a trend that may be used to develop preventive measures.

It is an aspect of the present invention to retain trend data relating to a particular STB and a group of STBs.

These and other aspects of the present invention will become apparent from a review of the description that follows.

In an embodiment of the present invention, a set top box (STB) analysis server for a hybrid-fiber-coax (HFC) cable network comprises a query library, a query checker processor, and a display server. The query library comprises instructions for acquiring STB state data elements indicative of the state of an STB associated with an STB MAC address. The query checker processor generates an interactive graphical display that accepts a query from an STB checker client. In an embodiment of the present invention, the query comprises the STB MAC address and identifies the queried STB state data elements to be obtained for the STB. By way of illustration and not as a limitation, the STB state data elements are selected from the group consisting of subscriber data, STB operational data, network component data, STB diagnostic data and VOD data.

In another embodiment of the present invention, the subscriber data comprises a subscriber name, a subscriber address, an account number associated with the subscriber name, the MAC address of the STB, a cable network node assigned to provide upstream and downstream connectivity to the STB, a description of the STB, a description of a CPE unit associated with the account number, a MAC address associated with the CPE unit, a subscriber credit limit, a subscriber pay-per-view credit limit, and a descriptor indicative of whether the STB is enabled for digital cable.

In still another embodiment of the present invention, the operational data comprise STB version, operating code version, the STB location in the network, the private network address assigned to the STB, VOD node set, VOD service group, and services which may be provided to the STB.

In yet another embodiment of the present invention, the STB diagnostic data comprises an uptime measure, an FDC signal level, an RDC signal level, a tuner frequency in MHZ that the STB is tuned to, a tuner measure indicative of the adjustment necessary to tune to that frequency, a QAM SNR, applications currently running on the STB, and a version identifier associated with an application.

In another embodiment, the instructions for acquiring the STB diagnostic data from the STB are delivered to the STB as SNMP messages.

In another embodiment of the present invention, the instructions for acquiring the STB diagnostic data from the STB are delivered to the STB as command line interface instructions.

In another embodiment of the present invention, the VOD data comprises VOD streams accessed by the STB and VOD errors reported by the STB.

The query checker processor executes query instructions from the query library responsive to the queried STB state data elements to obtain the queried STB state data elements. The display server receives the queried STB state data elements and creates an STB analytical record from the STB state data elements. The STB analytical record is sent to an STB checker client for display. In an embodiment of the present invention, the STB checker client comprises a Web browser and the analytical record comprises a Web page.

In an embodiment of the present invention, the STB analysis server further comprises a result analyzer. The result analyzer determines whether an STB state data element is within a predetermined range. If the STB state data element is within a predetermined range, the result analyzer assigns a first graphical attribute to the STB state data element. If the STB state data element is outside a predetermined range, the result analyzer assigns a second graphical attribute to the STB state data element. The STB state data element and an assigned graphical attribute are assigned to a display server. The display server uses the STB state data element and the assigned graphical attribute to create the analytical record. In another embodiment of the present invention, first and second graphical attributes are display colors.

In an embodiment of the present invention, the STB analysis server further comprises a client network interface that communicates with the STB checker client via a client network. By way of illustration and not as a limitation, the client network may be, without limitation, a wired network, a wireless network, a local area network, or the Internet.

In another embodiment of the present invention, the STB analysis server further comprises a cable network interface that communicates with the STB via a cable network path. In another embodiment of the present invention, the path in the cable network path is a DOCSIS-compliant channel.

In an alternate embodiment of the present invention, the STB analysis server further comprises a result analyzer. The result analyzer receives STB state data elements and uses these elements to determine whether an STB state data element is within a predetermined range. The result analyzer selects STB state elements determined to be outside a predetermined range, determines if the selected STB state elements are indicative of a common fault, and if the selected STB state elements are indicative of a common fault, identifies the common fault in the analytical record.

According to yet another embodiment of the present invention, an STB comprises a digital video recorder (DVR), the query library further comprises instructions for acquiring DVR state data elements indicative of the state of the DVR, and the query further identifies queried DVR state data elements to be obtained from the DVR. By way of illustration and not as a limitation, the DVR state data elements to be obtained from the DVR are selected from group consisting of a number of recordings, a number of scheduled recordings, and free disk space.

Yet another embodiment of the present invention provides a method for evaluating the operational status of a set top box (STB) in a hybrid-fiber-coax (HFC) cable network. A query from an STB checker client is received. The query comprises an STB MAC address and identifies queried STB state data elements to be obtained for the STB. Query instructions are accessed from a query library responsive to the queried STB state data elements identified in the query. The query instructions are executed to obtain the queried STB state data elements. The STB state data elements are received at a display server. An STB analytical record is created and sent to an STB checker client for display.

In another embodiment of the present invention, the queried STB state data elements are provided to a result analyzer. A determination is made whether an STB state data element is within a predetermined range. If the STB state data element is within a predetermined range, a first graphical attribute is assigned to the STB state data element. If the STB state data element is outside a predetermined range, then a second graphical attribute is assigned to the STB state data element. The STB state data element and an assigned graphical attribute are provided to a display server. An analytical record is created using the STB state data element and the assigned graphical attribute.

In another alternate embodiment of the present invention, the queried STB state data elements are provided to a result analyzer. A determination is made whether an STB state data element is within a predetermined range. STB state elements determined to be outside a predetermined range are selected. A determination is made whether the selected STB state elements are indicative of a common fault. If the selected STB state elements are indicative of a common fault, the common fault is identified in the STB analytical record.

DETAILED DESCRIPTION

The following terms are used in the description that follows. The definitions are provided for clarity of understanding:

| | |
|---|---|
| CM - | cable modem. |
| CPE - | Customer premises equipment. |
| CCS - | Central Control System. |
| HFC - | Hybrid-fiber-coax. A network design that employs both fiber optic and coaxial cables to deliver cable video and data services. |
| IP address - | IP address as used herein means a uniquely addressable identifier associated with network or home equipment capable of responding to a ping. |
| LVP - | Label value pair. As applied to the present application, the "label" is a descriptor of a data element and the "value" represents the value assigned to the data element for a specified modem. |
| RDC level - | Reverse data carrier level. A measure of the signal strength of the upstream signal generated by an STB or other CPE device. |
| STB - | Set top box. As used herein, a STB comprises a standalone device and a device meeting the OpenCable Applications Platform Specification (OCAP), sometimes referred to as a DSG client. |
| Two-way | Describes the capability of a CPE unit to both receive signals from a cable headend or data center in the downstream direction and send signals to the headend or data center in the upstream direction. |
| VOD - | Video on demand. VOD is the generic term for a collection of services such as HBO on demand (HOD), movies on demand (MODULATOR) SVOD (subscription video on demand), FOD (free on demand), and other similar services. |

In an embodiment of the present invention, an STB analysis system comprises an STB checker client and an STB analysis server. The STB checker client comprises an STB query interface (herein, "SQI") to communicate with the STB analysis server to acquire information indicative of the operational status of an STB and to display the information graphically. In this embodiment, the STB checker client comprises the SQI, a processor, a display, a user input, and a LAN interface. In another embodiment of the present invention, the processor, the display, the user input, and LAN interface functions are provided by a general purpose computing device and the SQI functionality is provided by a Web browser.

A user requests data relating to a particular STB by entering the MAC address of the STB into a query field. The STB checker client interacts with an STB analysis server to acquire information relating to the subscriber associated with the STB MAC address, the services authorized for the STB, and data indicative of the status and performance of the STB. By way of illustration and not as a limitation, the STB checker client displays administrative information comprising subscriber identifying information and account information. In addition, the STB analysis server interacts with the STB operating system to retrieve diagnostic data from the STB logs. The STB checker client further is adapted to permit remotely resetting the STB regardless of its current status.

In another embodiment of the present invention, the STB analysis server retains usage data that may be used to assess trends in STB and network performance based upon area of service, equipment type, or customer premises.

Figure 1:
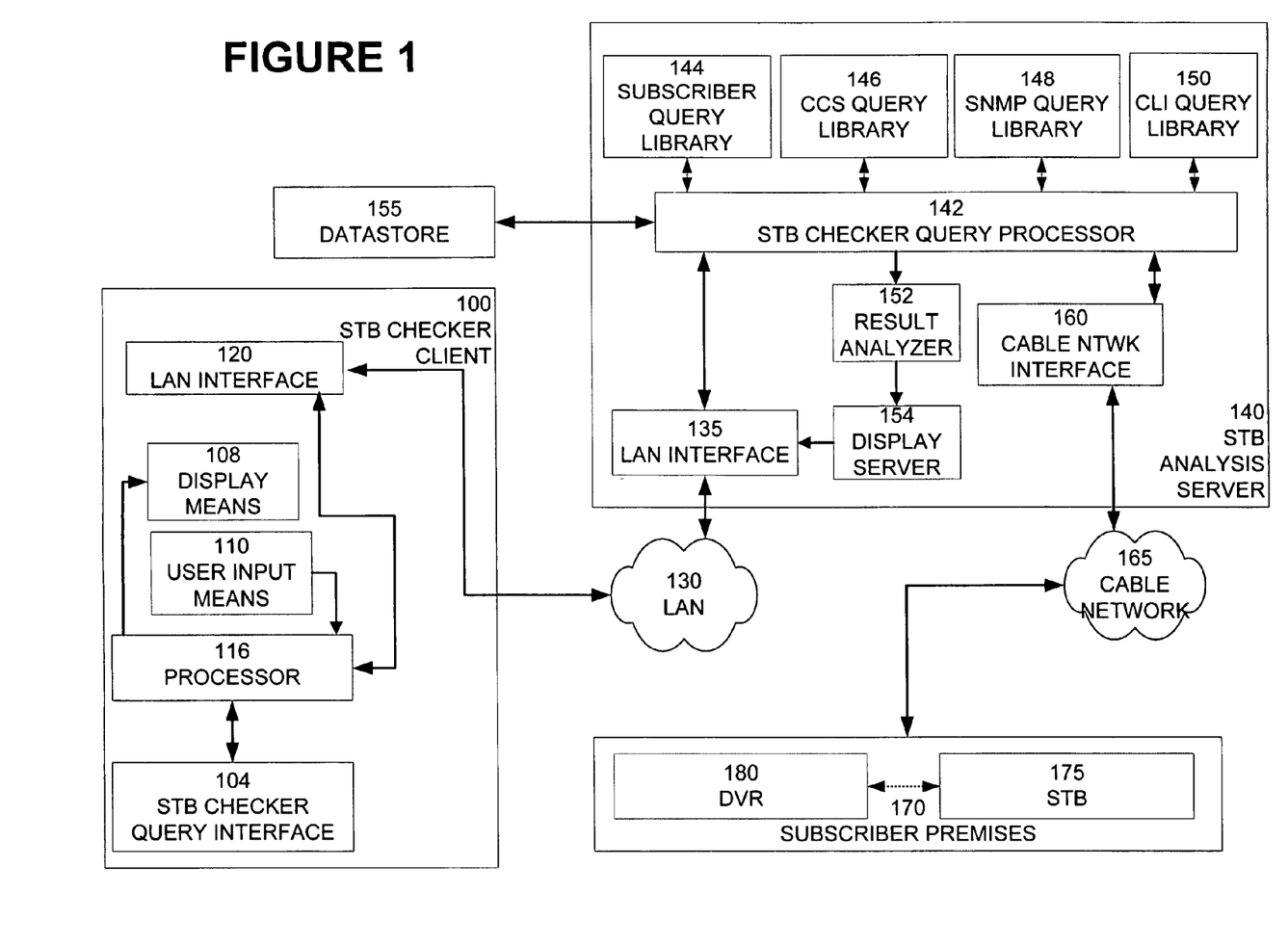
FIG. 1 illustrates the logical components of an STB checker client in a cable television system according to an embodiment of the present invention.

FIG. 1 illustrates the logical components of an STB checker client and server in a cable television system according to an embodiment of the present invention. Referring to FIG. 1, an STB checker client 100 comprises an STB query interface ("SQI") 104, a display 108, a user input 110, a processor 116 and a LAN interface 120.

In another embodiment of the present invention, the display 108, the user input 110, processor 116 and LAN interface 120 are provided by a general purpose computing device. By way of illustration and not as a limitation, the general purpose computing device may be, without limitation, a laptop computer, a personal digital assistant, or a handheld computer. In an exemplary embodiment of the present invention, the general purpose computing device is an Intermec 6400 Keypad Handheld Computer. As will be appreciated by those skilled in the art, other general purpose and portable wireless computing devices may be used to provide the functions of display 108, user input 110, processor 116 and LAN interface 120 without departing from the scope of the present invention.

Display 108 may be, without limitation, an LCD, a plasma, or other display device. Input 110 may be, without limitation, a mouse, a touch pad, a keypad, a key board, a touch-sensitive screen, a voice recognition system or other input device suitable for the particular computing device providing the functions of STB checker client 100.

In another embodiment of the present invention, the functionality of SQI 104 is provided by a Web browser.

SQI 104 interacts with STB analysis server 140 via processor 116, LAN interface 120, LAN 130, and LAN interface 135. LAN interface 135 passes STB queries from STB checker client 100 to STB checker query processor 142 within STB analysis server 140. STB analysis server 140 may be, without limitation, located in a cable network headend, in a cable network data center, in a network operations center or other suitable location determined by the cable network operator. In another embodiment of the present invention, STB checker query processor 142 comprises a Web server that provides Web pages to STB checker client 100 via SQI 104.

When STB analysis server 140 is first accessed by SQI 104, STB checker query processor 142 generates an interactive graphical display that accepts an STB MAC address. The user enters an STB MAC address which is passed via processor 116, LAN interface 120, LAN 130, to LAN interface 135 within STB analysis server 140. The LAN 130 and its associated interfaces, 120 and 135, provide a communication path between STB checker client 100 and STB analysis server 140. As will appreciated by those skilled in the art, LAN 130 may be, without limitation, a wired or wireless network and interfaces 120 and 135 are selected as appropriate to the network type.

STB checker query processor 142 uses libraries of instruction sets to acquire data from various datastores. An instruction set comprises computer instructions that query a database for particular information relating to a particular STB. FIG. 1 illustrates a subscriber query library 144, a Central Control System (CCS) query library 146, an SNMP query library 148 and a command line interface (CLI) query library 150. However, this is not meant as a limitation. Other query libraries may be used without departing from the scope of the present invention.

Referring again to FIG. 1, STB checker query processor 142 uses subscriber query library 144 and CCS query library 146 to obtain STB-related information from datastore 155. By way of illustration and not as a limitation, stored STB-related information comprises subscriber identifying data, account data, registration data, provisioning data, data associating the STB 175 with particular cable network components, and data indicative of the current state of those cable network components to which the STB 175 is associated. These data provide a "picture" of the physical location of STB 175 in the cable network 165, the service level to which the subscriber is entitled, the service level to which the STB 175 has been configured, and the condition of the path between the STB 175 and the cable network 165.

While datastore 155 is illustrated as a single entity, stored data relevant to the status of an STB may be distributed among a number of databases and storage devices. As will be appreciated by those skilled in the art, datastore 155 comprises these databases and storage devices.

STB checker query processor 142 also uses SNMP query library 148 and command line interface (CLI) query library 150 to obtain diagnostic information directly from STB 175. Diagnostic information comprises values indicative of the state of the STB and logged historical data.

In an embodiment of the present invention, STB analysis server 140 further comprises a result analyzer 152 and a display server 154. Result analyzer 152 reviews the data acquired from STB query processor 142 and assigns graphical attributes to any data that are outside expected limits. By way of illustration and not as a limitation, a graphical attribute may be, without limitation, a display color, a display intensity, an object shape, and a display modulation, such as blinking or motion. These data and the graphical attributes are passed to display server 154, which returns an interactive graphical display (see, FIG. 2, 200) to STB checker query interface 104. The content of the interactive graphical display represents an analytical record of STB 175. STB checker query interface 104 then causes processor 116 to output the interactive graphical display to display 108.

Cable network interface 160 connects STB analysis server 140 to STB 175 in subscriber premises 170 via cable network 165. STB 175 may be integrated with or connected to an optional digital video recorder (DVR) 180.

Figure 2:
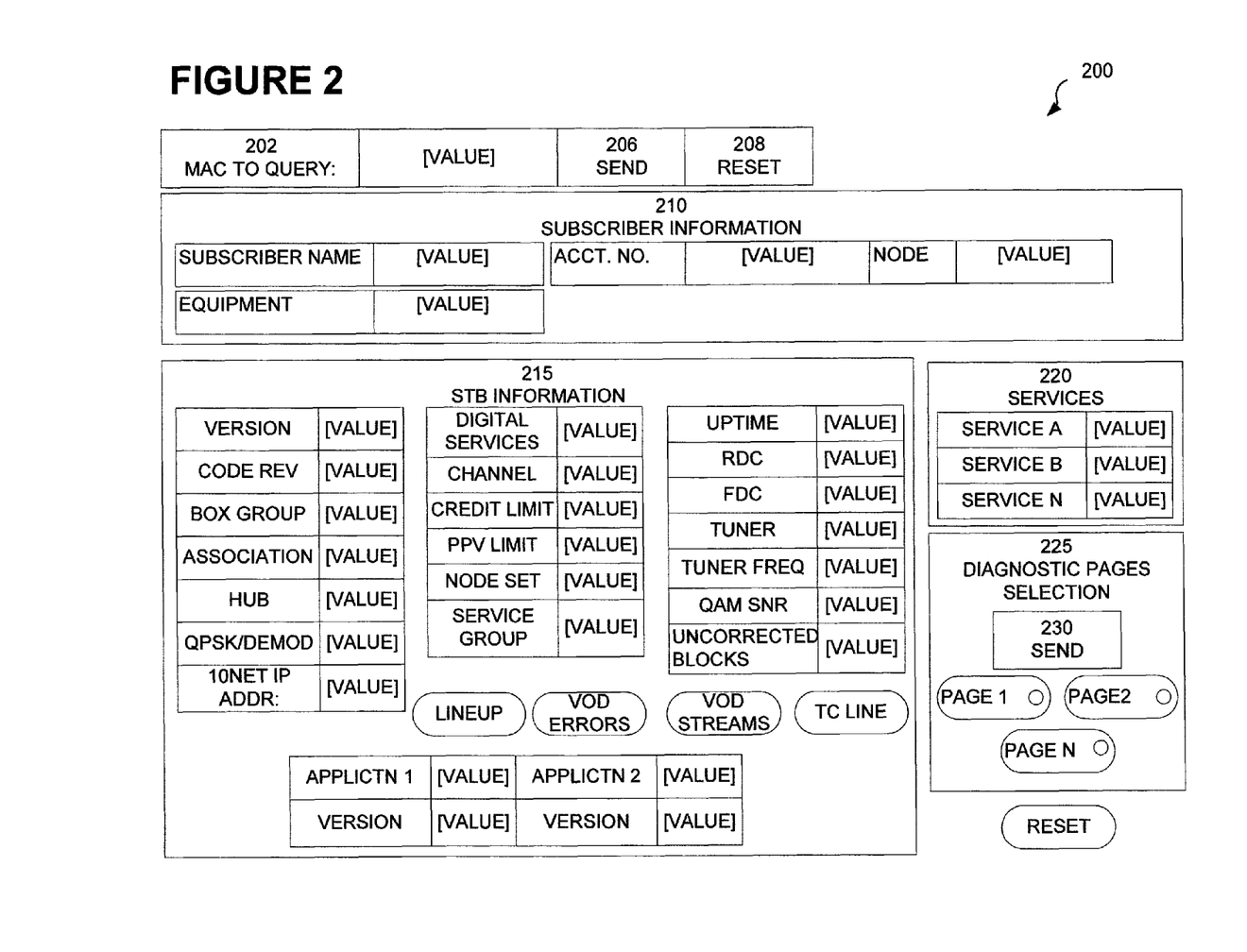
FIG. 2 illustrates an interactive graphical display produced by an STB checker server according to an embodiment of the present invention.

FIG. 2 illustrates an interactive graphical display produced by an STB checker server according to an embodiment of the present invention. Referring to FIG. 2, an interactive graphical display 200 comprises data blocks for SUBSCRIBER INFORMATION 210, STB INFORMATION 215, Services 220 and DIAGNOSTIC PAGES SELECTION 225. Data blocks further comprise label-value pairs (LVPs), where the label is a descriptor of a data element and the value represents the value assigned to the data element for a specified STB. The data blocks and the LVPs represent an analytical record of the specified STB.

The data blocks of Interactive graphical display 200 are organized by the type of information provided and the source of the information. The SUBSCRIBER INFORMATION 210 data block provides account information retrieved from the billing system. Customer name, account number, node, and additional equipment on the account are listed in this section.

STB INFORMATION 215 data block provides the live status data from the STB. A first group of LVPs reflects the operational configurations of the box as determined by the Digital Network Control System (not illustrated). The first group of LVPs comprises the STB version, operating code version, its position in the network, and the private network address assigned to the STB.

A second group of LVPs provides the broadcast channel and VOD information for the box. The second group of LVPs comprises values that reflect whether or not an STB is enabled for digital cable, provide broadcast channel and VOD information, and reflect the amount of pay-per-view titles the subscriber is authorized to purchase. The Node Set and Service group LVPs determine the status of the STB in the VOD network. VOD Streams and VOD Errors are links to subsections that list information about the VOD purchases the STB has attempted. These fields are retrieved in part from the billing system, the CCS database, and a VOD content store platform (not illustrated).

A third group of LVPs provides signal information and video diagnostic information obtained via SNMP. The third group of LVPs comprises values that reflect "uptime," the amount of time that has passed since the STB was last rebooted, the FDC and RDC signal levels the STB uses to communicate with the CCS, the current frequency in MHZ that the STB is connected to, and how much adjustment was necessary to tune to that frequency. For digital channels, values also reflect the QAM SNR representing the signal quality found on the channel frequency. Information indicative of the number of video data blocks that could not be corrected is also provided.

A fourth group of LVPs within STB INFORMATION 215 data block identifies the applications currently running on the STB, as well as the version of these applications.

SERVICES 220 data block comprises LVPs that reflect the services the STB receives.

DIAGNOSTIC PAGES SELECTION 225 data block comprises links to individual pages of the diagnostic screens available from an STB.

Interactive graphical display 200 further comprises a link to reset the STB.

In another embodiment of the present invention, an LVP that is associated with a value range is assigned a graphical attribute related to its actual value. By way of illustration and not as a limitation, if a value is found to be out of range of its associated range, the LVP is displayed with a red background. If a value is close to being out of range, the LVP is displayed with a yellow background. Otherwise the LVP is displayed using a default background color.

A "SEND" command block 206 directs STB checker client (see, FIG. 1, 100) to send a check STB query to a cable network diagnostic system (see, FIG. 1, 140) as previously described.

In another embodiment of the present invention, data block SUBSCRIBER INFORMATION 210 comprises LVPs "Subscriber Name," "Acct. No.," "Node," and "Equipment." The label "Subscriber Name" has the value of the name of the subscriber associated with the STB that was queried. The label "Acct. No." has the value of the subscriber account number associated with the selected STB. The label "Node" is assigned an identifier that is associated with the node that is in the upstream and downstream signal paths of the STB. The label "Equipment" has the value of a descriptor and the MAC address of other network equipment associated with the subscriber's account.

In another embodiment of the present invention, STB INFORMATION data block 215 comprises LVPs "Version," "Code Rev.," "Box Group," "Association," "Hub," "QPSK/DEMOD," "10NET IP Addr.," "Digital Service," "Channel," "Credit Limit," "PPV limit," "Node Set," "Service Group," "Uptime," "RDC," "FDC," "Tuner," "Tuner Freq.," and "Uncorrected Blocks." Hyperlinked objects, "VOD Streams" and "VOD Errors," provide access to information concerning the VOD streams accessed by the STB and the VOD errors that were reported by the STB. Hyperlinked object "Lineup" provides access to an image of the channel assignments associated with the STB. Hyperlinked object "TC Line" allows a user to request a form of the signal-related LVPs that may be copied and pasted to a trouble call work order.

The label "Version" is assigned a value indicative of the model number and version of the STB. The value associated with the label "Box Group" is indicative of the specific operating system download group to which this STB has been assigned. Box grouping is a method of defining what version of code should go to what STB. This value allows headend personnel to determine whether an STB is using "standard" operating system software or a beta version of an operating system and thus may operate differently than expected. In general use, this value associated with the label "Box Group" will be "Default," indicating that the STB runs code available to every STB.

The value associated with the label "Association" is indicative of the application software assigned to an STB and is determined by the value of the label "Box Group." This value is useful to headend personnel and to a Technical Support Representative, as it allows them to determine if the STB is running the code it should be.

The value associated with the label "Hub" is an identifier that designates the hub associated with the STB.

The value associated with the label "QPSK/demodulator" is an identifier that designates the QPSK and demodulator associated with the hub identified by the Hub LVP value.

The value associated with the label "10NET IP Address" is the private IP address of the cable network facing interface of the STB.

The label "Digital Services" is assigned a value of "enabled" or "disabled," as appropriate.

The label "Channel" is assigned the value of the channel to which the STB is tuned at the time the STB query was received by the cable network diagnostic system (see, FIG. 1, 140).

The label "Credit Limit" is assigned a value indicative of the current credit that may be extended to the subscriber.

The label "PPV limit" is assigned a value indicative of the current credit that may be extended to the subscriber for pay-per-view programming.

The label "Service Group" is assigned a value indicative of a logical grouping of STBs to which a particular STB has been assigned and is determined when a subscriber orders a VOD product. STBs in the same Service Group share a set of VOD resources.

The label "Node Set" is assigned a value indicative of a subgrouping of STBs within a Service Group to which a particular STB has been assigned and is determined when a subscriber orders a VOD product. The node set and the service group combine to define what VOD frequencies a given STB can view.

The label "Uptime" is assigned a value indicative of the elapsed time since the STB was registered with the cable network.

The label "RDC" is assigned a value indicative of the frequency to which the reverse data channel transmitter is currently set.

The label "FDC" is assigned a value indicative of the frequency to which the forward data channel (the "out-of-band" channel) transmitter is currently set.

The label "Tuner" is assigned a value indicative of the adjustment required to lock into the tuner frequency.

The label "Tuner Frequency" is assigned a value indicative of the frequency to which a cable box is currently tuned.

If the STB is tuned to a channel at the time the STB query is received by the cable network diagnostic system (see, FIG. 1, 140), then the label "QAM SNR" is assigned a value indicative of the signal to noise ratio of the QAM modulator through which the STB communicates.

The label "Uncorrected Blocks" is assigned a value indicative of the number of data blocks that could not be corrected using forward error correction. An excess of these may indicate a faulty STB or an otherwise invisible signal issue.

The labels "Applictn 1" and "Applictn 2" are assigned values indicative of the software applications currently running on the STB. While two LVPs are illustrated in FIG. 2, as will be appreciated by those skilled in the art additional applications may be displayed by the interactive graphical display 200 without departing from the scope of the present invention. Associated with each of the application LVPs is a version label that is assigned a value indicative of the version of the application to which the version label is associated.

In another embodiment of the present invention, SERVICES 220 comprises LVPs "Service A," "Service B," and "Service N." Each of these LVPs is associated with a value indicative of the services the subscriber is entitled to receive via the STB. While three service LVPs are illustrated in FIG. 2, as will be appreciated by those skilled in the art, any number of service LVPs may be displayed by interactive graphical display 200 without departing from the scope of the present invention.

In another embodiment of the present invention, DIAGNOSTIC PAGES 225 comprises action links "Page 1," "Page 2," and "Page N." The action links may be individual and cumulatively selected. A send command block 230 invokes a diagnostic page query utility (not illustrated) causing a diagnostic page query request to be directed to an STB diagnostic page query processor (not illustrated). The STB diagnostic page query processor (not illustrated) creates framework commands that query the STB operating system for diagnostic data stored in various logs of the STB.

Figure 3:
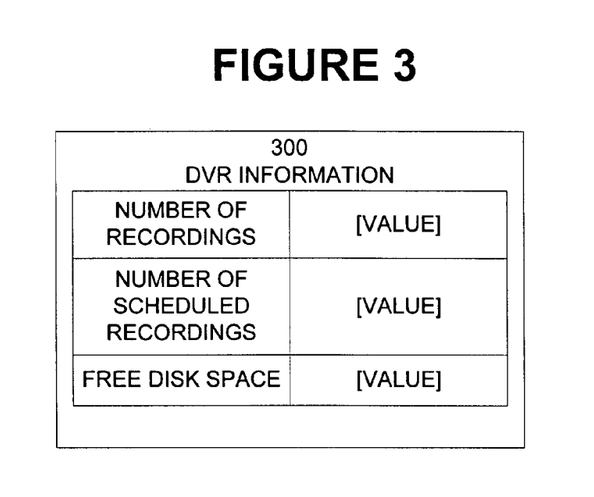
FIG. 3 illustrates an optional DVR interactive graphical display produced by an STB checker client according to an embodiment of the present invention.

FIG. 3 illustrates an optional DVR interactive graphical display produced by an STB checker client according to an embodiment of the present invention. As previously noted, an STB (see, FIG. 1, 175) may be connected to or integrated with a DVR (see, FIG. 1, 180). If the SUBSCRIBER INFORMATION 210 data block reflects the presence of a DVR, additional information is acquired by STB checker client (see, FIG. 1, 100). Referring to FIG. 3, a DVR INFORMATION 300 data block comprises LVPs "Number of Recordings," "Number of Scheduled Recordings," and "Free Disk Space." The label "Number of Recordings" is assigned a value indicative of the number of programs recorded on the DVR disk. The label "Number of Scheduled Recordings" is assigned a value indicative of the number of programs that have been scheduled for recording on the DVR disk. The label "Free Disk Space" is assigned a value indicative of the remaining space on the DVR disk.

Figure 4:
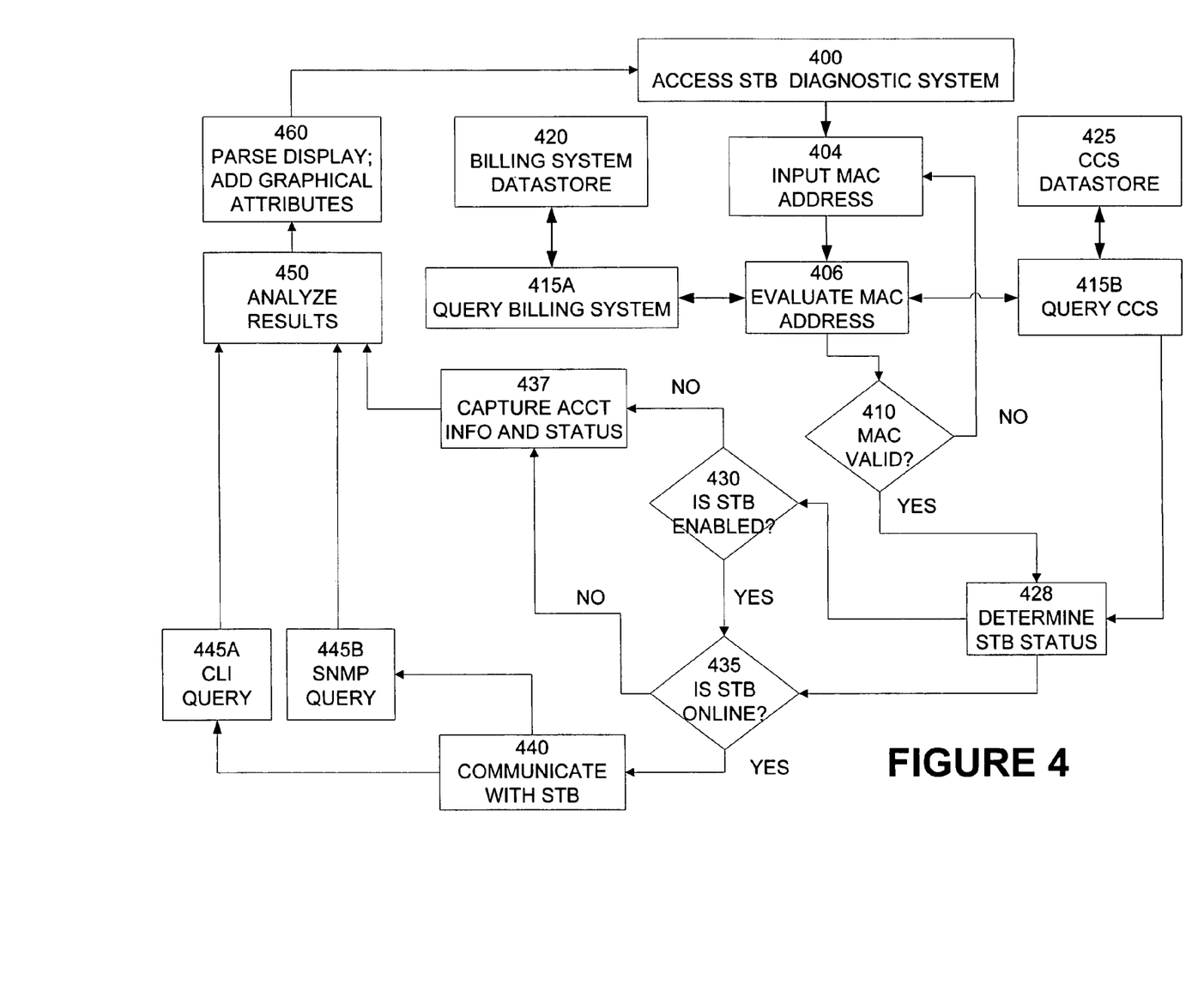
FIG. 4 illustrates a flow of a process by which an STB checker client is used to troubleshoot an STB according to an embodiment of the present invention.

FIG. 4 illustrates a flow of a process by which an STB checker client is used to troubleshoot an STB according to an embodiment of the present invention.

Referring to FIG. 4, a user accesses an STB analysis server 400 and receives an interactive graphical display comprising multiple LVPs and hyperlinked objects. The user enters a MAC address in a field of the interactive graphical display 404. Data is acquired to evaluate the MAC address that was entered 406. The STB checker query processor (see, FIG. 1, 142) simultaneously launches a billing system query 415A and a CCS query 415B. The billing system query is generated by reference to a subscriber query library (see, FIG. 1, 144) that comprises data request scripts constructed to obtain particular data elements from the billing system datastore 420. Similarly, the CCS query is generated by reference to a CCS query library (see, FIG. 1, 146) that comprises data request scripts constructed to obtain particular data elements from the CCS datastore 425. The queries return data that is used to evaluate the STB MAC address. By way of illustration and not as a limitation, the billing system query returns a subscriber account number and information as to whether the subscriber is entitled to receive service. The CCS query confirms whether the STB associated with the STB MAC address is "known" to the network.

A determination is made whether the STB MAC address is valid 410. If the MAC address is not valid, the user is prompted again to enter a MAC address 404. If the MAC address is valid 410, then the STB status is determined 428. A DNS query is issued 415B for data in the CCS datastore 425 relating to whether the STB is enabled 430 and if the STB is online 435. If the STB is not enabled and/or the STB is not online, the account information associated with the STB and status of the STB are captured 437 and passed to a result analyzer (see, FIG. 1, 152) where the results are analyzed 450. Data is parsed 460 to associate a value with a label to produce an interactive graphical display (see, FIG. 2) and returned to the user for display.

If the STB is determined to be enabled and online, communication with the STB is initiated 440. In another embodiment of the present invention, this communication is accomplished by simultaneously issuing a CLI query 445A and an SNMP 445B query of the STB. The SNMP query is generated by reference to an SNMP query library (see, FIG. 1, 148) that comprises data request scripts constructed to obtain particular data elements from the STB that are available through SNMP. Similarly, the CLI query is generated by reference to a CLI query library (see, FIG. 1, 150) that comprises data request scripts constructed to obtain particular data elements from the STB that are available through a command line interface.

The results of the SNMP query and CLI query, along with account information associated with the STB and status of the STB are passed to a result analyzer (see, FIG. 1, 152) where the results are analyzed 450. Data is parsed 460 to associate a value with a label to produce an interactive graphical display (see, FIG. 2) and returned to the user for display.

To illustrate the operation of the STB checker client and STB analysis server, consider a subscriber who is reporting pixilization of the image on a specific digital channel. In this situation, a CST would access the customer's account in the billing system to retrieve the MAC address of the STB in question and enter this address into the STB checker client. The STB analysis server determines that the STB is operational and assigned to an account. The STB analysis server then proceeds to retrieve all the information it can about the STB using the query libraries previously described. Referring to FIG. 2, the interactive display would reflect either that the SNR is low due to ingress, or that the tuner level is out of range. In addition the uncorrected blocks will show an increasing number as the STB continues to lose information. These LVPs would be displayed with a red or yellow background depending upon the severity of the issue. In this scenario, the CST determines the need for a field technician and sets up a trouble call using the TC line provided.

Another subscriber calls to report problems with VOD. Again the CST enters the MAC address and receives an interactive page as illustrated in FIG. 2. The CST reviews the signal levels and operational parameters of the STB. If the customer has credit on his or her account and is authorized for VOD, the CST then drills into the VOD Errors LVPs to determine what error conditions have occurred. Each error condition that has occurred in the last month for the STB in question is displayed in these LVPs. The errors also list what titles were attempted, along with the VOD network environment at the time of the attempt. Using this sub-section the CST determines if the issue is unique to the STB or if it needs to be given to the VOD group for further work.

One of the benefits of using the STB checker client of the present invention is that it establishes a standardized troubleshooting methodology by insuring that each CST has the same information available to diagnose issues in the same format. This allows for directed training at issues and resolutions which was not possible before. Prior to the invention of the STB checker client, each CST was responsible for walking the customer through accessing the diagnostic pages on the STB. This was complicated by the fact that the diagnostic pages report a copious amount of information, much of which is outside the scope of the CST's training. Additionally, accessing the diagnostic pages required a complex combination of keys to be entered on the STB by the subscriber, a fact that frustrated customers and CST's alike.

Another aspect of the present invention is the use of error data relating to failed STBs to determine whether data indicative of the status and performance of the STBs collected over time reflect a trend that may be used to develop preventive measures. By way of illustration and not as a limitation, status and performance data may be, without limitation, related to an STB manufacturer, a model, a model release, an operating system type and version, and an application type and version. Mean-time-between-failure data can also be compiled. Collection and trending of these data may, without limitation, permit STBs to be replaced or upgraded before a failure occurs. Alternatively, trending data may be used to make purchasing decisions to improve quality, performance, and reliability.

A system and method for evaluating the operational status of an STB in a cable network have been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the," is not to be construed as limiting the element to the singular. Moreover, a reference to a specific time, time interval, and instantiation of scripts or code segments is in all respects illustrative and not limiting.

What is claimed is:

1. A set top box (STB) analysis server for a hybrid-fiber-coax (HFC) cable network comprising:
   a simple network management protocol (SNMP) query library, wherein the SNMP query library comprises instructions for inclusion in an SNMP query for acquiring and reporting STB state data elements indicative of the state of an STB from the STB;
   a command link interface (CLI) query library, wherein the CLI query library comprises instructions for inclusion in a CLI query for acquiring and reporting STB state data elements indicative of the state of an STB from the STB;
   a subscriber query library, wherein the subscriber query library comprises instructions for inclusion in a subscriber query for acquiring and reporting subscriber information from a billing datastore;
   a central control system (CCS) query library, wherein the CCS query library comprises instructions for inclusion in a CCS query for determining and reporting whether an STB MAC address is known to the network and instructions for inclusion in a DNS query for determining and reporting in response to the DNS query whether the STB is enabled and online;
   a query checker processor, wherein the query checker processor comprises instructions that configure the query checker processor to perform operations comprising:
      generating an interactive graphical display that accepts a client query from an STB checker client, wherein the interactive graphical display comprises a MAC address field and wherein the client query identifies queried STB state data elements to be obtained for the STB;
      receiving a MAC address associated with the STB that is entered into the MAC address field;
      generating the subscriber query using the subscriber query library and generating the CCS query using the CCS query library;
      sending the subscriber query and the CCS query;
      determining from a response to the CCS query whether the entered MAC address is valid;
      when the entered MAC address is valid, then generating and sending the DNS query for status data in the CCS datastore;
      determining from the status data whether the STB associated with the entered MAC address is enabled and online; and
      when the entered MAC address is enabled and online, then generating and sending:
         the SNMP query for STB state data elements of the STB associated with the entered MAC address and responsive to the SNMP query, wherein the SNMP query is generated by reference to the queried STB state data elements and the SNMP query library; and
         the CLI query for the STB state data elements of the STB associated with the entered MAC address and responsive to the CLI query, wherein the CLI query is generated in reference to the STB state data elements and the CLI query library; and
      sending the subscriber information, the STB state data elements responsive to the SNMP query, the STB state data elements responsive to the CLI query, and the status data to a results analyzer;
   the results analyzer, wherein the results analyzer comprises instructions that configure the results analyzer to perform operations comprising:
      receiving the subscriber information, the STB state data elements responsive to the SNMP query, the STB state data elements responsive to the CLI query, and the status data;
      determining whether an STB state data element is within a predetermined range;
      assigning a first graphical attribute to STB state data elements that are outside the predetermined range; and sending the subscriber information, the STB state data elements responsive to the SNMP query, the STB state data elements responsive to the CLI query, the status data, and the first graphical attribute to a display server; and
   the display server, wherein the display server comprises instructions that configure the display server to perform operations comprising:
      receiving the subscriber information, the STB state data elements responsive to the SNMP query, the STB state data elements responsive to the CLI query, the status data and the first graphical attribute; and
      creating an STB analytical record from the subscriber information, the STB state data elements responsive to the SNMP query, the STB state data elements responsive to the CLI query, the status data and the first graphical attribute; and
      sending the STB analytical record to the STB checker client for display.

2. The STB analysis server of claim 1, wherein the STB checker client comprises a Web browser and wherein the analytical record comprises a Web page.

3. The STB analysis server of claim 1, wherein STB state data elements are selected from the group consisting of subscriber data, STB operational data, network component data, STB diagnostic data and VOD data.

4. The STB analysis server of claim 3, wherein subscriber data comprise a subscriber name, a subscriber address, an account number associated with the subscriber name, a cable network node assigned to provide upstream and downstream connectivity to the STB, a description of the STB, a description of a CPE unit associated with the account number, a MAC address associated with the CPE unit, a subscriber credit limit, a subscriber pay-per-view credit limit, and a descriptor indicative of whether the STB is enabled for digital cable.

5. The STB analysis server of claim 3, wherein the STB operational data comprise an STB version, an operating code version, a location of the STB in the network, a private network address assigned to the STB, a VOD node set, a VOD service group, and services that the STB is authorized to receive.

6. The STB analysis server of claim 1, wherein the diagnostic data comprise an uptime measure, an FDC signal level, an RDC signal level, a tuner frequency in MHZ that the STB is tuned to, a tuner measure indicative of an adjustment used to tune a particular frequency, a QAM SNR, applications currently running on the STB, and a version identifier associated with an application.

7. The STB analysis server of claim 3, wherein the VOD data comprise VOD streams accessed by the STB and VOD errors reported by the STB.

8. The STB analysis server of claim 1, wherein the results analyzer further comprises instructions that configure the results analyzer to perform operations comprising:

assigning a second graphical attribute to the STB state data element if the STB state data element is within the predetermined range;

providing the STB state data element and the second graphical attribute to the display server; and wherein the display server further comprises instructions that configure the display server to perform operations comprising using the STB state data element and the assigned second graphical attribute to create the analytical record.

9. The STB analysis server of claim 8, wherein the results analyzer further comprises instructions that configure the results analyzer to perform operations comprising:

selecting STB state data elements determined to be outside a predetermined range;

determining if the selected STB state data elements are indicative of a common fault; and identifying the common fault in the analytical record if the selected STB state data elements are indicative of a common fault.

10. The STB analysis server of claim 8, wherein the first and second graphical attributes are display colors.

11. The STB analysis server of claim 1 further comprising a client network interface configured to communicate with the STB checker client via a client network.

12. The STB analysis server of claim 11, wherein the client network is selected from the group consisting of a wired network, a wireless network, a local area network, and the Internet.

13. The STB analysis server of claim 1 further comprising a cable network interface configured to communicate with the STB via a cable network path.

14. The STB analysis server of claim 13, wherein the cable network path is selected from the group consisting of an out-of-band channel and a DOCSIS-compliant channel.

15. The STB analysis server of claim 1, wherein the STB comprises a digital video recorder (DVR), wherein the CLI query library and the SNMP query library further comprise instructions for acquiring DVR state data elements indicative of the state of the DVR, and wherein the CLI query and the SNMP query further comprise DVR state data elements to be obtained from the DVR.

16. The STB analysis server of claim 15, wherein the DVR state data elements to be obtained from the DVR are selected from the group consisting of a number of recordings, a number of scheduled recordings, and free disk space.

17. A method for evaluating the operational status of a set top box (STB) in a hybrid-fiber-coax (HFC) cable network comprising:

generating an interactive graphical display that accepts a client query from an STB checker client, wherein the interactive graphical display comprises a MAC address field and wherein the client query identifies queried STB state data elements to be obtained for the STB;

receiving a MAC address associated with the STB that is entered into the MAC address field;

generating the subscriber query using a subscriber query library, wherein the subscriber query library comprises instructions for inclusion in the subscriber query for acquiring and reporting subscriber information from a billing datastore;

generating the CCS query using a CCS query library, wherein the CCS query library comprises instructions for inclusion in the CCS query for determining and reporting whether an STB MAC address is known to the network and instructions for inclusion in a DNS query for determining and reporting in response to the DNS query whether the STB is enabled and online;

sending the subscriber query and the CCS query;

determining from a response to the CCS query whether the entered MAC address is valid;

when the entered MAC address is valid, then generating and sending the DNS query for status data in the CCS datastore;

determining from the status data whether the STB associated with the entered MAC address is enabled and online; and when the entered MAC address is enabled and online, then generating and sending:

a simple network management protocol (SNMP) query for STB state data elements of the STB associated with the entered MAC address and responsive to the SNMP query, wherein the SNMP query is generated by reference to the queried STB state data elements and an SNMP query library, and wherein the SNMP query library comprises instructions for inclusion in the SNMP query for acquiring and reporting STB state data elements indicative of the state of an STB from the STB; and a command line interface (CLI) query for the STB state data elements of the STB associated with the entered MAC address and responsive to the CLI query, wherein the CLI query is generated in reference to the STB state data elements and a CLI query library, and wherein the CLI query library comprises instructions for inclusion in the CLI query for acquiring and reporting STB state data elements indicative of the state of an STB from the STB; and sending the subscriber information, the STB state data elements responsive to the SNMP query, the STB state data elements responsive to the CLI query, and the status data to a results analyzer;

receiving the subscriber information, the STB state data elements responsive to the SNMP query, the STB state data elements responsive to the CLI query, and the status data at the results analyzer;

determining at the results analyzer whether the STB state data element is within a predetermined range;

assigning a first graphical attribute to STB state data elements that are outside the predetermined range;

sending the subscriber information, the STB state data elements responsive to the SNMP query, the STB state data elements responsive to the CLI query, the status data, and the first graphical attribute to a display server;

receiving the subscriber information, the STB state data elements responsive to the SNMP query, the STB state data elements responsive to the CLI query, the status data and the first graphical attribute at the display server;

creating an STB analytical record from the subscriber information, the STB state data elements responsive to the SNMP query, the STB state data elements responsive to the CLI query, the status data and the first graphical attribute; and sending the STB analytical record to the STB checker client for display.

18. The method of claim 17, wherein the STB checker client comprises a Web browser and wherein the analytical record comprises a Web page.

19. The method of claim 17, wherein STB state data elements are selected from the group consisting of subscriber data, STB operational data, network component data, STB diagnostic data and VOD data.

20. The method of claim 19, wherein subscriber data comprise a subscriber name, a subscriber address, an account number associated with the subscriber name, a cable network node assigned to provide upstream and downstream connectivity to the STB, a description of the STB, a description of a CPE unit associated with the account number, a MAC address associated with the CPE unit, a subscriber credit limit, a subscriber pay-per-view credit limit, and a descriptor indicative of whether the STB is enabled for digital cable.

21. The method of claim 19, wherein the STB operational data comprise an STB version, an operating code version, the STB location in the network, a private network address assigned to the STB, a VOD node set, a VOD service group, and services that may be provided to the STB.

22. The method of claim 19, wherein the diagnostic data comprise an uptime measure, an FDC signal level, an RDC signal level, a tuner frequency in MHZ that the STB is tuned to, a tuner measure indicative of an adjustment used to tune to a particular frequency, a QAM SNR, applications currently running on the STB, and a version identifier associated with an application.

23. The method of claim 17, wherein executing the query instructions to obtain the queried STB state data elements comprises communicating with the STB via a cable network path.

24. The method of claim 23, wherein the cable network path is selected from the group consisting of an out-of-band channel and a DOCSIS-compliant channel.

25. The method of claim 19, wherein VOD data comprise VOD streams accessed by the STB and VOD errors reported by the STB.

26. The method of claim 17 further comprising:
assigning a second graphical attribute to the STB state data element if the STB state data element is within the predetermined range;
providing the STB state data element and the second graphical attribute to the display server; and
creating the analytical record using the STB state data element and the second graphical attribute.

27. The method of claim 26 further comprising:
selecting STB state elements determined to be outside a predetermined range;
determining if the selected STB state elements are indicative of a common fault; and
identifying the common fault in the STB analytical record if the selected STB state elements are indicative of a common fault.

28. The method of claim 26, wherein the first and second graphical attributes are display colors.

29. The method of claim 17, wherein receiving a query from an STB checker client comprises receiving the query from the STB checker client via a client network.

30. The method of claim 29, wherein the client network is selected from the group consisting of a wired network, a wireless network, a local area network, and the Internet.

31. The method of claim 17, wherein the STB comprises a digital video recorder (DVR), wherein the CLI query library and the SNMP query library further comprise instructions for acquiring DVR state data elements indicative of the state of the DVR, and wherein the CLI query and the SNMP query further comprise queried DVR state data elements to be obtained from the DVR.

32. The method of claim 31, wherein the DVR state data elements to be obtained from the DVR are selected from the group consisting of a number of recordings, a number of scheduled recordings, and free disk space.

* * * * *